Jan. 13, 1970

R. E. CASAS 3,489,487

HIGH SPEED CATADIOPTRIC OBJECTIVE

Filed Dec. 18, 1967

INVENTOR.
Raul E. Casas
BY
Irving M. Kriegsman
ATTORNEY.

United States Patent Office 3,489,487
Patented Jan. 13, 1970

3,489,487
HIGH SPEED CATADIOPTRIC OBJECTIVE
Raul E. Casas, Danbury, Conn., assignor to The Perkin-Elmer Corporation, Norwalk, Conn., a corporation of New York
Filed Dec. 18, 1967, Ser. No. 691,572
Int. Cl. G02b *17/08*
U.S. Cl. 350—199                    2 Claims

ABSTRACT OF THE DISCLOSURE

An optical objective of the type having a concave spherical mirror. A first corrector component made up of spherical lenses is positioned optically in front of the spherical mirror to correct spherical aberration and a second corrector component made up of spherical lenses is positioned optically behind the spherical mirror to correct coma and astigmatism. Both corrector components are afocal systems.

---

Figure 1:
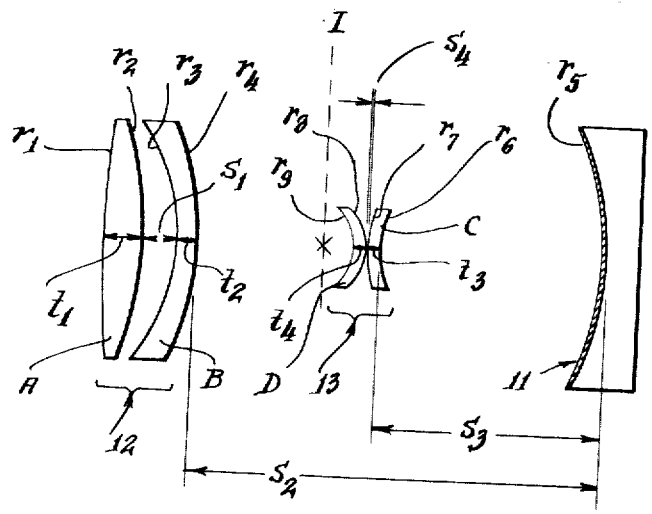

This invention relates to catadioptric type optical objectives. More particularly, this invention relates to a catadioptric objective having a spherical mirror which is useful in photography, electronic photosensing systems and other similar applications.

Optical objectives having a spherical mirror are now well known. Hitherto, it has been found that some of the image defects introduced as a result of the spherical mirror can be appreciably eliminated by means of a corrector component which is located optically and physically in front of the mirror. The corrector component has, in the prior art, been in the form of either an aspheric Schmidt type corrector plate or a plurality of spherically shaped lens elements. In U.S. Patent 2,350,112, there are shown some examples of an objective having a spherical mirror and a corrector component made up of a plurality of lens elements.

It is a general purpose of this invention to provide an optical objective having a spherical mirror of very high speed, a reasonable field of view and good image quality over a broad spectral range.

For high apertures, a Schmidt type corrector is not too satisfactory insofar as there will be residual chromatic aberration. A corrector made up of a plurality of lens elements is also not too satisfactory for high apertures insofar as there will be high order spherical aberration and longitudinal color.

Accordingly, it is an object of this invention to provide a new and improved optical objective.

It is another object of this invention to provide a catadioptric objective of very high speed, a reasonable field of view and good image quality over a broad spectral range.

It is still another object of this invention to provide a catadioptric objective having no aspheric surfaces.

The above and other objects are achieved by constructing an objective according to this invention.

Basically, the objective is made up of a spherical mirror and two afocal corrector components. One of the corrector components, i.e. the first corrector component, is located physically and optically in front of the spherical mirror. The other afocal corrector component, i.e. the second corrector component is located physically in front of and optically behind the spherical mirror. Both corrector components are made up of lens elements containing no aspheric surfaces. In one embodiment, light reflected by the spherical mirror passes directly through the second corrector component. In another embodiment, light reflected by the spherical mirror is reflected off a plane mirror and then passes through the second corrector component. In both embodiments, the image plane lies between the first corrector and the spherical mirror.

Insofar as both correctors are afocal, the objective is applicable for use over a broad region of the spectrum. Another feature of the invention is the low central obstruction ratio which is in the order of about 7% of the whole aperture.

The first corrector compensates for the spherical aberration of the spherical mirror and the second corrector is designed with over-corrected coma and astigmatism to compensate for the under-correction of both of these aberrations from the spherical mirror.

A clearer concept of the scope and purpose of the invention along with other advantages and features thereof will be obtained from the following detailed description taken in conjunction with the drawings, and the novel features will be particularly pointed out hereinafter in connection with the appended claims.

Figure 2:
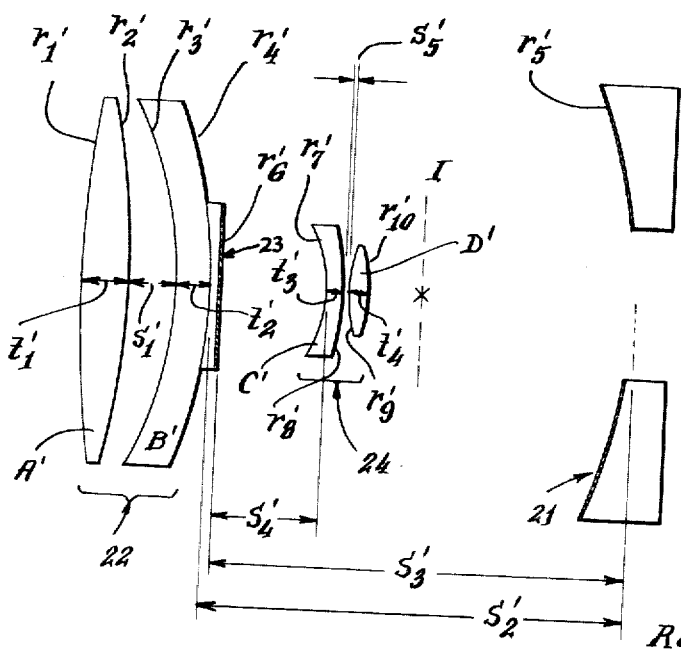

In the drawings:
FIGURE 1 is an optical diagram of an example of one embodiment of the invention; and
FIGURE 2 is an optical diagram of an example of another embodiment of the invention.

Referring now to FIGURE 1, there is shown an example of an objective constructed according to this invention.

The objective includes a mirror 11, a first corrector component 12 positioned optically and physically in front of the mirror 11 and a second corrector component 13 positioned optically behind and physically in front of the mirror 11.

Mirror 11 is concave and spherically shaped.

Both corrector components are afocal systems, do not contain aspheric surfaces and may be made of materials having the same index of refraction and Abbe number. Corrector component 12 is a doublet and consists of a double convex lens element A and a negative meniscus lens element B concave to the front. Corrector component 13 is also a doublet and consists of a positive meniscus element convex to the front and a negative meniscus element concave to the front.

In the following chart, there is listed a table of values for one example of an objective constructed according to this invention. As is well known in the art, a plus sign is used to denote that a surface is convex to the front and that a distance is measured from left to right whereas a minus sign is used to denote that a surface is concave to the front and that a distance is measured from right to left.

CHART I

| Component | Element | Radius | Spacing and Thickness |
|---|---|---|---|
| 12 | A | $r_1 = 1710.0$ | $t_1 = 10.0$ |
|  |  | $r_2 = -445.5$ | $S_1 = 21.6$ |
|  | B | $r_3 = -178.4$ | $t_2 = 10.6$ |
|  |  | $r_4 = -376.7$ | $S_2 = 224.2$ |
| 11 |  | $r_5 = -376.7$ | $S_3 = -118.6$ |
|  |  | $r_6 = 145.6$ | $t_3 = -6.2$ |
|  | C | $r_7 = 147.5$ | $S_4 = -1.0$ |
| 13 | D | $r_8 = -30.3$ | $t_4 = -6.2$ |
|  |  | $r_9 = -25.5$ |  |

Relative aperture=$f/.95$.
Distance from last lens vertex to image plane=$-12$.
E.F.L.=140.
Total field of view=5°.
Index of refraction of all refractive elements=1.51872.
Abbe number for all refractive elements=64.17.

Referring now to FIGURE 2, there is shown an example of another embodiment of an objective constructed according to this invention.

The objective includes a mirror 21, a first corrector component 22 positioned optically and physically in front of the mirror 21, a mirror 23 positioned physically in front of and optically behind the mirror 21 and a second corrector component 24 positioned optically and physically behind the mirror 23.

Mirror 21 is concave, spherically shaped and may be provided with a central aperture to permit the insertion of electronic, mechanical or other equipment.

Both corrector components are afocal systems and do not contain any aspheric surfaces. Corrector component 22 is a doublet and consists of a double convex lens element A' and a negative meniscus lens element B' concave to the front. Mirror 23 is also plano and may be mounted directly on the back surface of lens element B'. The primary purpose of plano mirror 23 is to redirect the light beam back so that the image will be formed physically behind the first corrector component 22. Corrector component is also a doublet and consists of a negative meniscus lens element C' concave to the front and a double convex lens element D'.

In the following chart, there is listed a table of values for one example of an objective constructed according to this invention.

CHART II

| Component | Element | Radius | Spacings and Thickness | Index of Refraction | Abbe No. |
|---|---|---|---|---|---|
| 22 | A' | $r_1' = 2221.8$ | $t_1' = 34$ | 1.51872 | 64.17 |
|  |  | $r_2' = -1313.0$ | $S_1' = 35$ | Air |  |
|  | B' | $r_3' = -609.9$ | $t_2' = 25$ | 1.51872 | 64.17 |
|  |  | $r_4' = -2275.0$ | $S_2' = 301$ | Air |  |
| 21 |  | $r_5' = -921.5$ | $S_3' = -291$ | Air |  |
| 23 |  | $r_6' = \infty$ | $S_4' = 103$ | Air |  |
| 24 | C' | $r_7' = -170.6$ | $t_3' = 12$ | 1.72311 | 29.51 |
|  |  | $r_8' = -276.4$ | $S_5' = 3$ | Air |  |
|  | D' | $r_9' = 176.8$ | $t_4' = 12$ | 1.51872 | 64.17 |
|  |  | $r_{10}' = 254.0$ |  |  |  |

Relative aperture = $f/1.2$
E.F.L. = 414
Distance from last lens vertex to image plane = 40.
Total field of view = 5.8°.

What is claimed is:
1. An optical objective comprising:
   (a) a spherical mirror (11),
   (b) a first corrector component (12) including a spherical lens element (A) and spherical lens element (B),
   (c) a second corrector component (13) including a spherical lens element (C) and a spherical lens element (D), and characterized by the following data:

CHART I

| Component | Element | Radius | Spacing and Thickness |
|---|---|---|---|
| 12 | A | $r_1 = 1710.0$ | $t_1 = 19.0$ |
|  |  | $r_2 = -445.5$ | $S_1 = 21.6$ |
|  | B | $r_3 = -178.4$ | $t_2 = 10.6$ |
| 11 |  | $r_4 = -376.7$ |  |
|  |  | $r_5 = -376.7$ | $S_2 = 224.2$ |
|  |  | $r_6 = 145.6$ | $S_3 = -118.6$ |
| 13 | C | $r_7 = 147.5$ | $t_3 = -6.2$ |
|  | D | $r_8 = -30.3$ | $S_4 = -1.0$ |
|  |  | $r_9 = -25.5$ | $t_4 = -6.2$ |

Relative aperture = $f/.95$.
Distance from last lens vertex to image plane = −12.
E.F.L. = 140.
Total field of view = 5°.
Index of refraction of all refractive elements = 1.51872.
Abbe number for all refractive elements = 64.17.

2. An optical objective comprising:
   (a) a spherical mirror (21),
   (b) a first corrector component (22) including a spherical lens element A' and spherical lens element (B'),
   (c) a mirror (23),
   (d) a second corrector component (24) including a spherical lens element (C') and a spherical lens element (D), and characterized by the following data:

CHART II

| Component | Element | Radius | Spacings and Thickness | Index of Refraction | Abbe No. |
|---|---|---|---|---|---|
| 22 | A' | $r_1' = 2221.8$ | $t_1' = 34$ | 1.51872 | 64.17 |
|  |  | $r_2' = -1313.0$ | $S_1' = 35$ | Air |  |
|  | B' | $r_3' = -609.9$ | $t_2' = 25$ | 1.51872 | 64.17 |
|  |  | $r_4' = -2275.0$ | $S_2' = 301$ | Air |  |
| 21 |  | $r_5' = -921.5$ | $S_3' = -291$ | Air |  |
| 23 |  | $r_6' = \infty$ | $S_4' = 103$ | Air |  |
| 24 | C' | $r_7' = -170.6$ | $t_3' = 12$ | 1.72311 | 29.51 |
|  |  | $r_8' = -276.4$ | $S_5' = 3$ | Air |  |
|  | D' | $r_9' = 176.8$ | $t_4' = 12$ | 1.51872 | 64.17 |
|  |  | $r_{10}' = 254.0$ |  |  |  |

Relative aperture = $f/1.2$
E.F.L. = 414
Distance from last lens vertex to image plane = 40.
Total field of view = 5.8°.

References Cited

UNITED STATES PATENTS 2,509,554  5/1950  Wynne _____ 350—199
2,726,574  12/1955  Mandler _____ 350—199
2,982,861  5/1961  Menke _____ 350—199 X

FOREIGN PATENTS 1,476,149  2/1967  France.

JOHN K. CORBIN, Primary Examiner

U.S. Cl. X.R.
350—212

UNITED STATES PATENT OFFICE

CERTIFICATE OF CORRECTION

Patent No. 3,489,487            Dated January 13, 1970

It is certified that error appears in the above-identified patent and that said Letters Patent are hereby corrected as shown below:

Column 1 lines 18 and 19 change the last sentence of the Abstract to read --Both corrector components in combination provide an afocal system--; and line 62 before "corrector" delete "afocal".

Column 2 line 1 change this line to read --Insofar as the combination of both correctors is afocal, the objective is--; line 31 change this line to read --Both corrector components are, in combination, an afocal system, do not--; line 37 before "meniscus" change "positive" to --negative--; line 38 before "convex" insert --C--; and line 39 before "concave" insert --D--.

Columns 3 and 4 in the last line of charts II (line 50) change "$r_{10}' = 254.0$" to -- $r_{10}' = -254.0$ --.

SIGNED AND SEALED

SEP 29 1970

(SEAL)
Attest:

Edward M. Fletcher, Jr.
Attesting Officer

WILLIAM E. SCHUYLER, JR.
                                         Commissioner of Patents